United States Patent [19]

Ishikawa

[11] Patent Number: 5,179,690
[45] Date of Patent: Jan. 12, 1993

[54] SYSTEM FOR DISPLAY EMULATION BY INTERCEPTING AND CHANGING CONTROL DATA STORED IN ONE OF MULTIPLE TEMPORARY REGISTERS TO SUITABLE DISPLAY CONTROL DATA

[75] Inventor: Yasuo Ishikawa, Kanagawa-ken, Japan

[73] Assignee: Mitsubishi Denki Kabushiki Kaisha, Japan

[21] Appl. No.: 414,955

[22] Filed: Sep. 29, 1989

[30] Foreign Application Priority Data

Sep. 29, 1988 [JP] Japan .................. 63-245284

[51] Int. Cl.⁵ .......................... G06F 5/00; G06F 3/14
[52] U.S. Cl. ................... 395/500; 364/DIG. 2; 364/927.81; 364/927.2; 364/926.93; 395/112
[58] Field of Search ............... 364/200, 900; 395/162, 395/163, 164, 500, 112

[56] References Cited

U.S. PATENT DOCUMENTS

| | | | |
|---|---|---|---|
| 3,846,763 | 11/1974 | Riikonen | 340/172.5 |
| 3,938,101 | 2/1976 | Lewis et al. | 340/172.5 |
| 4,330,847 | 5/1982 | Kuseski | 364/900 |
| 4,463,442 | 7/1984 | Dachowshi et al. | 364/900 |
| 4,559,614 | 12/1985 | Peek et al. | 364/900 |
| 4,603,385 | 7/1986 | Mueller et al. | 364/200 |
| 4,713,779 | 12/1987 | Graciotti et al. | 395/275 |
| 4,875,186 | 10/1989 | Blume, Jr. | 364/900 |
| 4,920,481 | 4/1990 | Binkley et al. | 364/200 |
| 4,965,750 | 10/1990 | Matsuo et al. | 364/521 |
| 5,060,140 | 10/1991 | Brown et al. | 364/200 |

FOREIGN PATENT DOCUMENTS 2179185A 2/1987 United Kingdom .

Primary Examiner—Thomas C. Lee
Assistant Examiner—Thomas S. Taylor
Attorney, Agent, or Firm—Wolf, Greenfield & Sacks

[57] ABSTRACT

A display emulating system in which control data for controlling a display are tentatively stored in a temporary register and modified to appropriate data suitable for the display, and then stored in an internal register within a controller for controlling the display.

2 Claims, 4 Drawing Sheets

SYSTEM FOR DISPLAY EMULATION BY INTERCEPTING AND CHANGING CONTROL DATA STORED IN ONE OF MULTIPLE TEMPORARY REGISTERS TO SUITABLE DISPLAY CONTROL DATA

BACKGROUND OF THE INVENTION

1. Field of the Invention:

This invention relates generally to a display emulating system and, more particularly, to a system capable of emulating different display units, that is, executing a program prepared for another display to imitate means for controlling another display.

The term "emulation" is generally defined as a technique for executing programs which are developed for other computers or systems having different architecture.

The emulation technique is used, for example, when it is desirable for a computer or a system to use a program prepared for another computer or another system having a different architecture. The emulation is also useful in such a case where compatibility should be maintained even after the architecture has been changed. A display emulating system according to the present invention emulates various kinds of displaying means such as a monitor, a plasma display and a liquid crystal display (LCD) wherein the resolutions and controlling methods thereof are different from each other.

2. Prior Art

The prior art will be described in taking the case of a panel display, for example a liquid crystal display.

FIG. 1 is a block diagram of a panel display system in the prior art. In FIG. 1, a display controller section 17 includes a panel controller 1 which is connected to a system bus 1a through an address bus 1b and a command bus 1c. The panel controller 1 is also connected to the system bus 1a through a data buffer 2 which is connected to the system bus 1a and the panel controller 1 through a system data bus 1d and a data bus 2a, respectively. The panel controller 1 controls the operation of a panel display 3 through a panel interface buffer 8 which receives panel data 8a from the panel controller 1 and sends interface signals 8b to the panel display 3. A clock signal for the panel controller 1 is provided by a crystal 4. The display controller section 17 further includes a video memory 5, a character generator 6 and a data controlling circuit 7. The video memory 5 and the data controlling circuit 7 are controlled by a memory control signal 5a and a data control signal 7a, respectively. An address signal and data are transmitted through a memory address/data bus 5b among the panel controller 1, video memory 5, character generator 6 and data controlling circuit 7. Character data generated by the generator 6 are transferred to the panel controller 1 under control of the circuit 7. In order to store data for controlling the display operation, the panel controller 1 is provided with a group of internal registers 20.

In operation, control data prepared so as to satisfy the specification of the panel display 3 are stored in the internal registers 20 within the panel controller 1. The control data comprises, for example, the number of rows able to be displayed, the number of columns able to be displayed, the number of dots arranged in rows and columns usable for display, the position of a cursor and the shape of a cursor.

The control data are set up using a program such as an application software or a system software and are transmitted to the panel controller 1 through the system bus 1a. The panel controller 1 receives the control data through the address bus 1b, command bus 1c and data bus 2a, and stores such data in the internal registers 20. The data to be displayed on the panel display 3 are inputted into the panel controller 1 through the data bus 2a, address bus 1b, and command bus 1c, and then written in predetermined locations within the video memory 5 through the memory address/data bus 5b.

In the displaying operation, the panel controller 1 controls the operation in accordance with the contents stored in the internal registers 20. First, the data stored at an address 0 (zero) of the video memory 5 are read out on the memory address/data bus 5b in accordance with the memory control signal 5a. Such data are changed to the character data 6a by the character generator 6, and then returned to the panel controller 1 through the data controlling circuit 7. The panel controller 1 further modifies the received data to generate the panel data 8a which are further changed by the panel interface buffer 8 to the interface signals 8b to be displayed on the panel display 3. The operation of the reading out of the data, modifying the data and outputting the modified data is repeated until the address is increased from zero to the location which is the last of a complete image. The image is refreshed by repeating the operation of displaying the image, whereby the display function is carried out.

A panel control signal for controlling the panel display 3 is produced on the basis of the control data stored in the registers 20 and transmitted as the interface signals 8b through the panel interface buffer 8.

Since panel display system in the prior art are thus constructed, the internal registers 20 within the panel controller 1 must be set up so as to correspond to the specification of a panel display each time the program is replaced with another in order to obtain a desirable display operation. If the contents of the internal registers 20 are directly rewritten by an application software such that unsuitable control data are stored in the registers, an appropriate display cannot be carried out.

SUMMARY OF THE INVENTION

Accordingly, it is a primary object of the present invention to overcome the foregoing problems and to provide a display emulating system capable of prohibiting an application software which directs a group of internal registers to store undesirable data from rewriting such undesirable data and which is capable of transforming the undesirable data into a suitable form and writing the transformed data, whereby an appropriate display is obtainable by emulation.

A display emulating system according to the present invention includes an emulation circuit and an emulation control section in addition to the conventional display system. The emulation circuit comprises (1) a group of temporary registers for storing control data from a bus, (2) means for identifying a register storing the control data sent from the bus among the group of temporary registers, (3) a destination switching means for directing the destination of the control data from the bus to the group of temporary registers in the emulation circuit during the emulation and directing the destination of the control data to a group of internal registers in a display controller section during no emulating operation in accordance with an emulation enabling signal from the bus, and (4) means for activating the emulation control section. The emulation control section comprises (1) means for identifying the register storing the control data within the group of temporary registers by using the identifying means in the emulation circuit, (2) means for transforming into a suitable value when the value of control data stored in the identified register is not suitable, and (3) means for setting the suitably transformed control data into a group of internal registers in the display controller section.

With such an arrangement, (1) the emulation circuit selects the place of storage of the control data from the bus between the group of internal registers in the display controller section and the group of temporary registers in the emulation circuit. During the emulation, the control data are stored in the temporary registers and the writing of the control data into the internal registers in the display controller section is inhibited. (2) The emulation control section, when new control data are written in the temporary registers, sets them in the internal registers after modification to an appropriate form if the value of data is not suitable.

In accordance with the present invention, even if programs written for other display systems tend to set unsuitable control data, such data are not written directly into the internal registers but are replaced with data suitable to an extent whereby the emulation can be accomplished.

BRIEF DESCRIPTION OF THE DRAWINGS

For a better understanding of the invention, reference is made to the accompanying drawings, in which.

DETAILED DESCRIPTION OF THE PREFERRED EMBODIMENT

Figure 1:
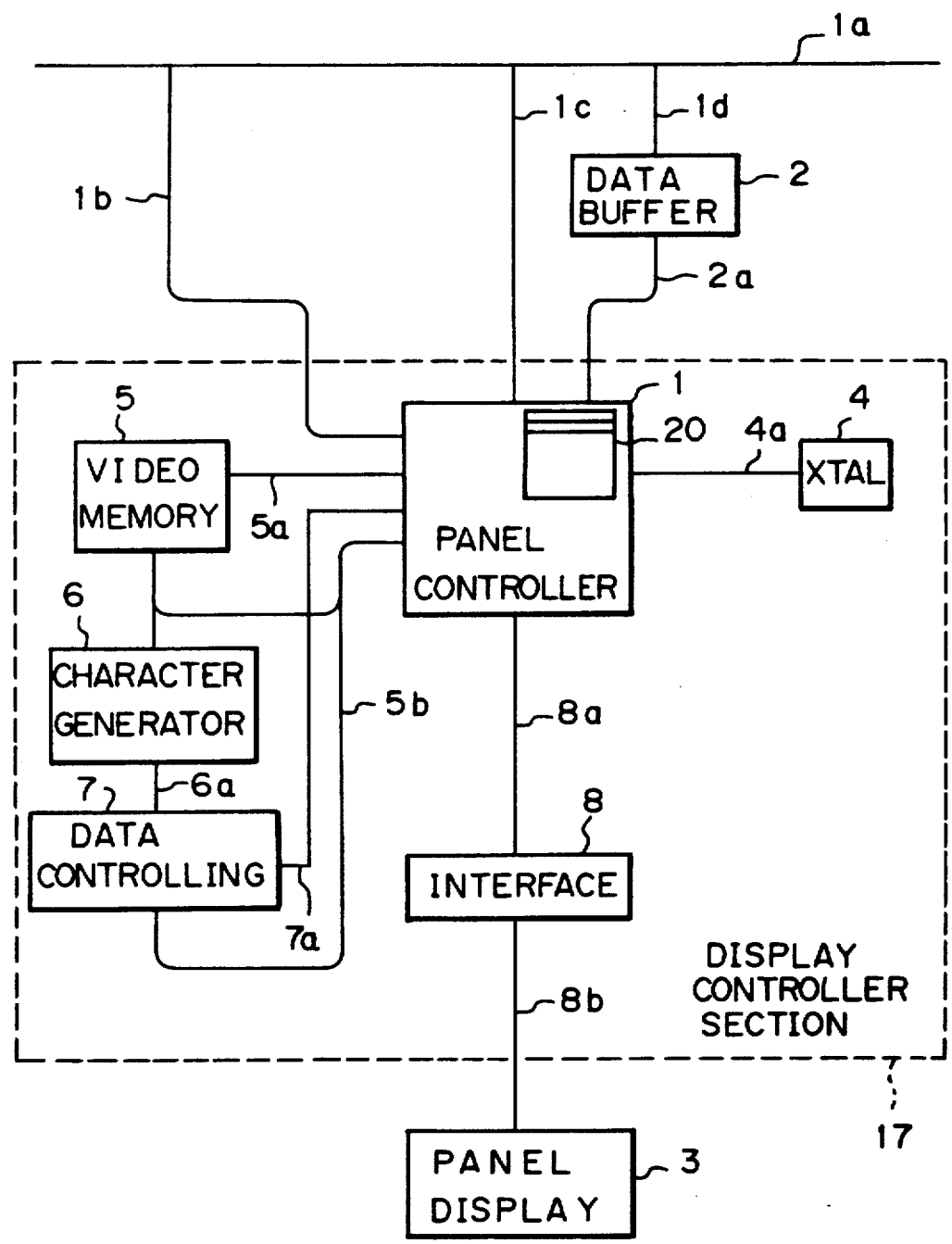
FIG. 1 is a block diagram illustrating a panel display system in the prior art.
Figure 2:
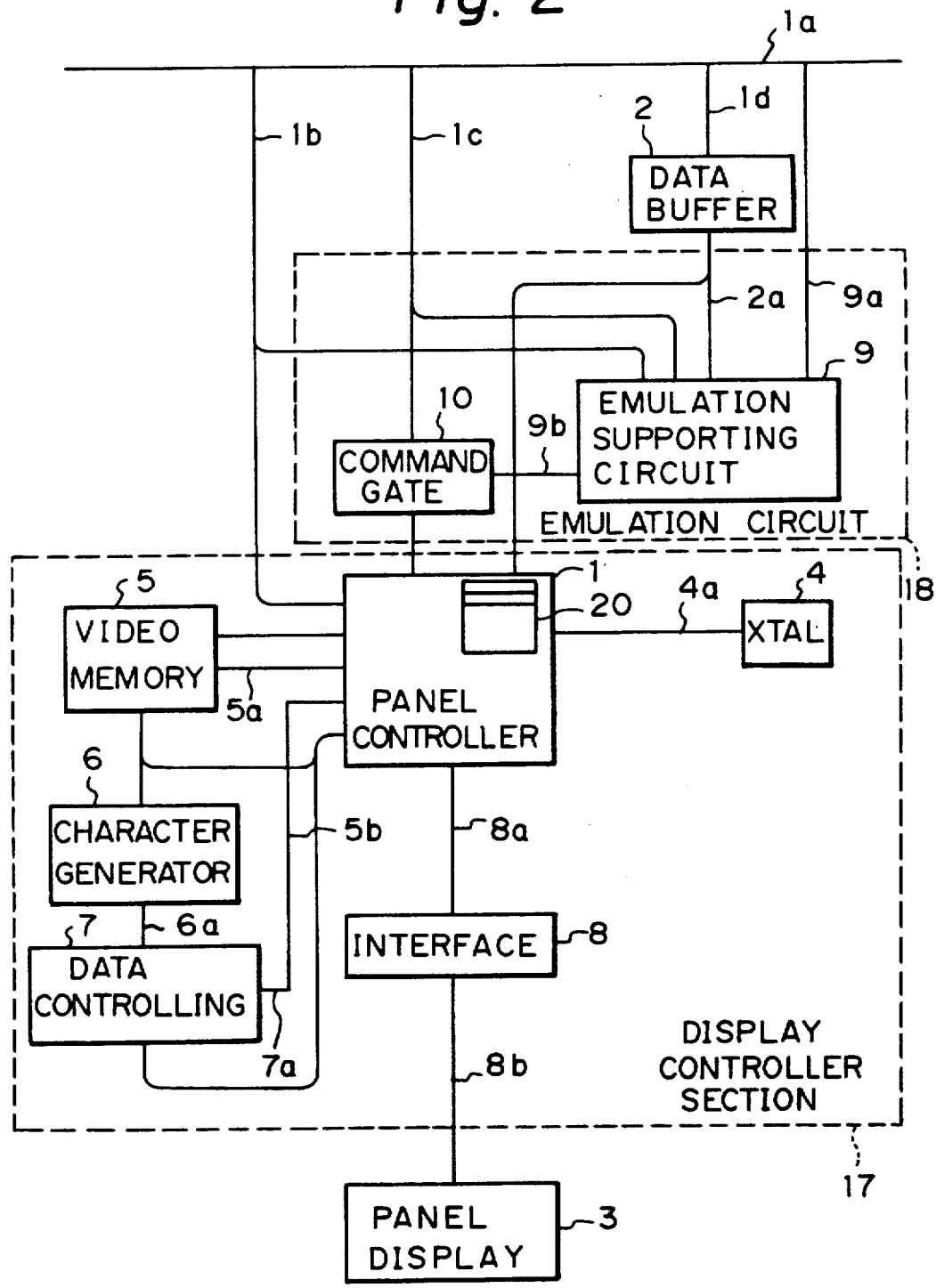
FIG. 2 is a block diagram illustrating an embodiment of a display emulating system in accordance with the present invention.

Referring first to FIG. 2, there is shown the block diagram of a display emulating system in accordance with the present invention. In FIG. 2, the elements represented by the reference numerals 1–8b, 17 and 20 are similar to those shown in FIG. 1. In accordance with the present invention, there is provided an emulation circuit 18 which comprises an emulation supporting circuit 9 and a command gate circuit 10. The emulation supporting circuit 9 provides a system bus 1a with an emulation starting signal 9a which signals the system bus 1a to activate an emulation control section. Also, the emulation supporting circuit 9 provides the command gate circuit 10 with a gate control signal 9b which determines the validity/invalidity of the writing/reading operation of the internal registers in a panel controller 1. In response to the gate control signal 9b, the command gate circuit 10 enables or disenables the internal registers to do the writing/reading operation.

Figure 3:
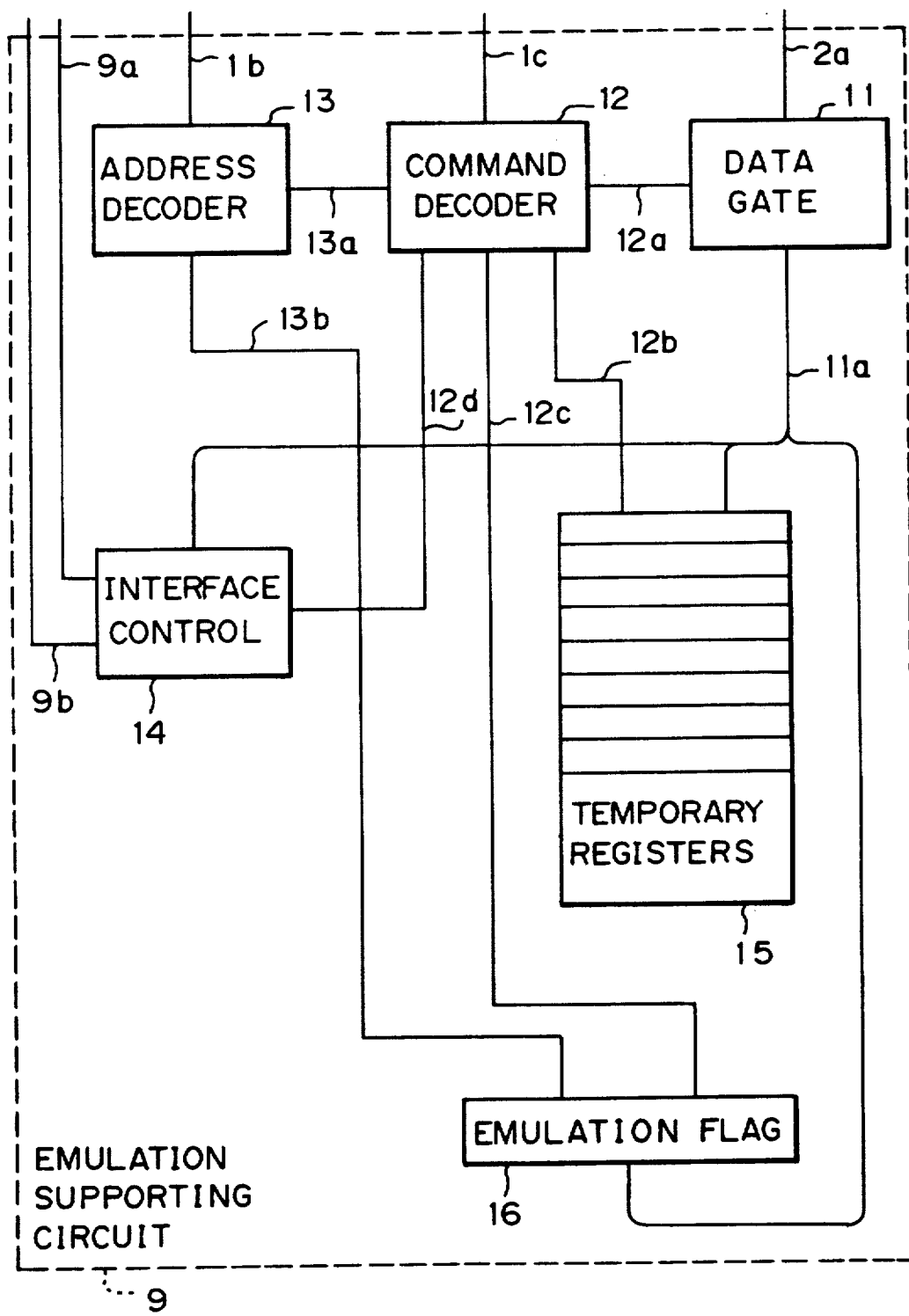
FIG. 3 is a block diagram illustrating a primary portion of an emulation circuit according to the invention.

Referring now to FIG. 3, the emulation supporting circuit 9 comprises a data gate circuit 11, a command decoder 12, an address decoder 13, an interface control circuit 14, a group of temporary registers 15 and an emulation flag 16 for identifying an updated register within the group of registers 15. An emulation data bus 11a is controlled by the data gate circuit 11. The command decoder 12 provides the data gate circuit 11 with a data gate signal 12a for controlling it, and provides the temporary registers 15 with a file register control signal 12b, and provides the emulation flag 16 with a flag register control signal 12c, and provides the interface control circuit 14 with an interface control signal 12d. The address decoder 13 transmits an address decode signal 13a to the command decoder 12 and supplies the emulation flag 16 with a flag signal which is to be written therein.

The operation of the writing of data into the video memory and the displaying operation are similar to the prior art. The emulating operation according to the present invention will be described next.

First, in response to an emulation enable signal transmitted through the system bus 1a, the interface control circuit 14 activates the gate control signal 9b which causes the command gate circuit 10 to inhibit the internal registers within the panel controller 1 from writing the control data. The control data transmitted after that through a data bus 2a will be directed to the temporary registers 15 within the emulation circuit 18.

Figure 4:
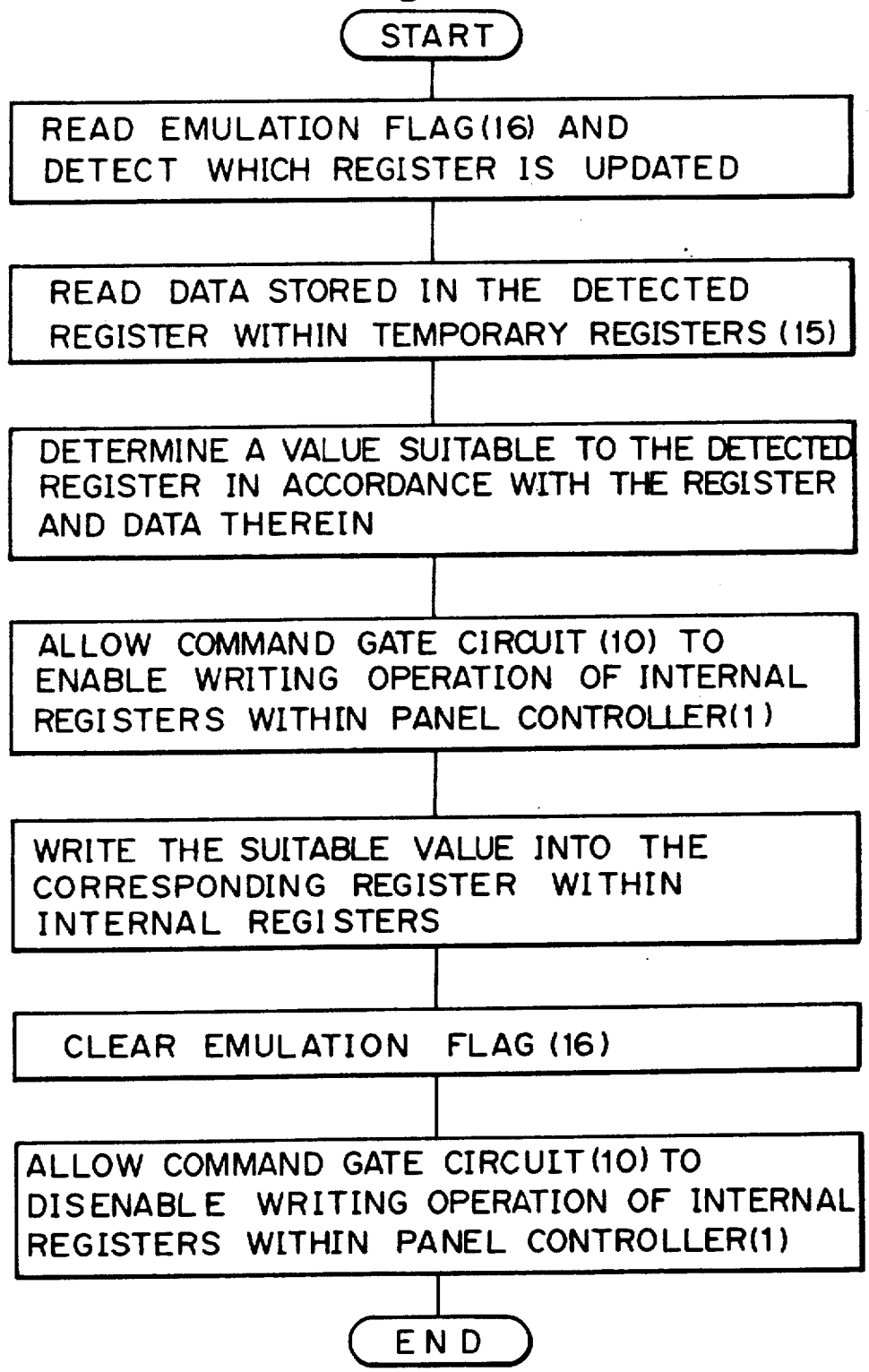
FIG. 4 is a flowchart showing the operation of an emulation control section.

Next, an application software is executed. At this time, even if the application software tends to change data such as the image plane size for the panel display, more particularly to change the contents of an internal register $R_o$ (not shown) to the value $X_o$ which is unstable in the panel display, the contents of the register $R_o$ cannot be changed because the command gate circuit 10 are prohibiting the writing operation as mentioned above. Then, the address decoder 13 sets the bit of the emulation flag 16 corresponding to the register address of the register $R_o$ and the value $X_o$ is written into the register within the temporary registers 15 corresponding to the register $R_o$; Further, the interface control circuit 14 enables the emulation starting signal 9a to activate the emulation control section of the system. The emulation control section operates as shown in the flowchart of FIG. 4. The emulation control section detects which register is newly written data in accordance with the emulation flag 16 and determines a value suitable to the detected register. Then, the command gate circuit 10 is allowed to enable the writing operation of the internal registers 20, and the determined suitable value is written into the internal register corresponding to the detected register. After that, the writing operation of the internal registers 20 is again inhibited.

The above-mentioned function is similarly operated for all internal registers within the panel controller 1. Thus, even if an application program gives an instruction to write unsuitable data into the internal registers, such a writing operation is inhibited and the unsuitable data are changed to data suitable for the panel display 3.

In accordance with the present invention, since the emulation circuit and the emulation control section are built into the system, the application program need not be modified and the program can be emulated for display.

Next, a concrete example of the emulating operation will be described. It is assumed that an application program is adapted to a display having the image plane of 200×100 dots, while the actual panel display has the image plane of 400×250 dots.

The application program will be executed to output data in which the number of dots in rows and columns is 200 and 100, respectively in order to initialize the system to establish the value of display size as 200×100 dots. If the value is directly stored in the internal registers 20, the capacity of displaying images on 400×250 dots will be underutilized, that is, only a quarter of the panel display is used. In accordance with the present invention, however, before the execution of the application program, an emulation enabling signal is applied to the system bus for signaling the start of emulation by a system switch, a system program or the like. In response to the emulation enabling signal, the command gate circuit 10 inhibits the control data, 200 and 100, from being transmitted to the panel controller 1, the data are transferred to the emulation circuit 18 instead. The emulation control section changes the value of the number of dots in rows and columns (200 and 100) to 400 and 200, respectively by doubling 200 and 100 on the basis of the capacity of the panel display (400×250 dots). The value of 400 and 200 is set in the internal registers 20 within the panel controller 1. Thus, the data executed by the application program are displayed on the plane of 400×200 dots, although the region of 50 dots is not used.

As described above, according to the present invention, displaying of data is always accomplished in a suitable fashion without changing an application program even if the program is replaced by another.

This completes the description of the embodiment of the invention. However, many modifications will be apparent to those skilled in the art without departing from the spirit and scope of the invention. For example, although the emulation flag and the temporary register are prepared for all the internal registers in the above-mentioned embodiment, some bits of the emulation flag and registers corresponding to the internal registers which are not deemed to store unsuitable data may be removed. In addition, the panel display shown in the embodiment may be replaced by other displays such as a monitor. Further, what is emulated may be the number of rows and columns of a character or other control data rather than the resolution of the display shown in the embodiment.

What is claimed is:

1. A method of performing emulation comprising the steps of:
    transmitting control data into an internal register within a controller of a display unit;
    transmitting display data to be displayed on a displaying means;
    transmitting an emulation enabling signal;
    interrupting each initial transmission of control data into said internal register within the controller of the display unit in response to the emulation enabling signal;
    activating, in response to the emulation enabling signal, through an interface control circuit, a gate control signal causing a command gate circuit to inhibit the internal register from writing the control data;
    enabling, through an interface control circuit, the emulation enabling signal to activate a control section of an emulation circuit;
    storing said control data transmitted through a bus in a temporary register within a group of temporary registers within the emulation circuit;
    during the storing, providing command signals by a command decoder, including providing an address command to an address decoder, which stores the address within the group of temporary registers, providing an interface command to the interface control circuit, providing a flag command to an emulation flag, which provides information about the newly written-to temporary register, providing a temporary register command to the group of temporary registers, and providing a data gate command to a data gate circuit, which controls the flow of data to the temporary registers;
    detecting which one of said temporary registers includes newly written data therein in accordance with the emulation flag;
    determining whether the control data stored in the detected temporary register is suitable for the display unit through use of the command decoder and data gate circuit;
    changing the control data stored in the detected temporary register to data suitable for the display unit when the stored data is not suitable for the display unit through use of the address decoder, command decoder and data gate circuit;
    updating the commands sent by the command decoder to the address decoder, the data gate circuit and the emulation flag to reflect whether data has been changed;
    sending a command from the command decoder to the interface control informing the interface control that data within the detected temporary register is now suitable for the display unit;
    transferring the suitable control data stored in the detected temporary register into the internal register within the controller of the display unit; and
    displaying the display data transmitted through the bus on the display unit under control of the controller in accordance with the suitable control data stored in the internal register.

2. A display emulating system comprising:
    (a) means for displaying data;
    (b) a bus means for transmitting the following information:
        (b1) displaying data to be displayed on said displaying means,
        (b2) control data for controlling said displaying means, and
        (b3) an emulation enabling signal for signaling the start and the end of emulating operation;
    (c) a display controller means comprising:
        (c1) a group of internal registers storing the control data from said bus means,
        (c2) memory storing the displaying data from said bus means, and
        (c3) means for causing said displaying means to displaying the displaying data stored in said memory in accordance with the control data stored in the internal registers;
    (d) an emulation circuit means comprising:
        (d1) a group of temporary registers storing the control data from said bus means,
        (d2) a register identifying means for identifying the register in which the control data are stored out of said group of temporary registers,
        (d3) a destination switching means for directing the control data from said bus means to said group of temporary registers in said emulation circuit means or to said group of internal registers in said display controller means in accordance with the emulation enable signal, and
        (d4) means for starting an emulation control means; and
    (e) said emulation control means comprising:

(e1) means for triggering the interruption of each initial transmission of control data into the group of internal registers and storing said control data within the group of temporary registers, (e2) means for identifying the register which stores the control data within said group of temporary registers by using said register identifying means in said emulation circuit means, (e3) means for changing the control data to appropriate data when the control data stored in the identified register are not appropriate, and (e4) means for transferring the appropriately changed control data from said group of temporary registers into said group of internal registers in said display controller means.

* * * * *